United States Patent [19]
Woodruff

[11] 3,989,316
[45] Nov. 2, 1976

[54] HYDROSTATIC SUSPENSION SYSTEM FOR A CYLINDRICAL MASS

[75] Inventor: Frank Woodruff, New Hartford, N.Y.

[73] Assignee: The Bendix Corporation, Teterboro, N.J.

[22] Filed: June 24, 1975

[21] Appl. No.: 589,818

[52] U.S. Cl. ................................. 308/9; 73/517 R; 308/122
[51] Int. Cl.² ......................................... F16C 17/16
[58] Field of Search ................. 308/9, 122, DIG. 1; 73/517 R, 517 A

[56] References Cited
UNITED STATES PATENTS

| | | |
|---|---|---|
| 3,507,158 | 4/1970 | Wilcox et al. ............................ 308/9 |
| 3,749,456 | 7/1973 | Whitaker ................................. 308/9 |
| 3,785,708 | 1/1974 | Miyasaki ......................... 308/122 X |
| 3,899,222 | 8/1975 | Mendelevsky et al. ............. 308/9 X |

*Primary Examiner*—M. H. Wood, Jr.
*Assistant Examiner*—Gene A. Church
*Attorney, Agent, or Firm*—Anthony F. Cuoco

[57] ABSTRACT

A hydrostatic suspension system for supporting a cylindrical mass, such as an inertial mass, within a housing filled with viscous fluid while eliminating contact between the mass and housing. With the arrangement described tolerances and concentricities of the mass and housing are relaxed to practical values.

9 Claims, 4 Drawing Figures

HYDROSTATIC SUSPENSION SYSTEM FOR A CYLINDRICAL MASS

CROSS REFERENCE TO RELATED APPLICATIONS

The hydrostatic suspension system of the invention is an improvement over the suspension system described in a commonly assigned U.S. application Ser. No. 555,924, filed Mar. 6, 1976 by Lael B. Taplin for an Integrating Angular Accelerometer.

BACKGROUND OF THE INVENTION

1. Field of the Invention

This invention relates generally to means for supporting a cylindrical mass within a housing and, particularly, to hydrostatic supporting means for the purposes described. More particularly, this invention relates to means for supporting the mass within the housing while eliminating contact between the mass and the housing and without controlling dimensional tolerances of the parts within extraordinary limits.

2. Description of the Prior Art

An integrating angular accelerometer such as described in the aforenoted copending U.S. application Ser. No. 555,924 measures the angular rate of a rotating body and includes a stationary cylindrical inertial mass supported by a low drag hydrostatic bearing concentrically in a housing rotatable relative thereto and filled with a viscous fluid. In this type of arrangement close radial clearances must be maintained and a multiplicity of close tolerance dimensions and concentricities must be controlled within extraordinary limits. The tolerances which govern end clearances must be likewise controlled. These two factors combine to present manufacturing disadvantages. The present invention overcomes these disadvantages in that the tolerances involved may be relaxed to more practical values.

SUMMARY OF THE INVENTION

This invention contemplates a system of the type described including a housing having a bore slightly larger in diameter than the outside diameter of a cylindrical mass. A plurality of recesses are formed in the bore and which recesses are bounded by arcuate and straight lands in cooperative relation to provide hydrostatic bearing recesses. The arcuate lands are machined or otherwise provided integral with the bore and the straight lands are machined or otherwise provided in inserts supported in slots carried in the bore. The bearing recesses are supplied with a pressurized viscous fluid flowing from an inlet port to a manifold, and the flow to individual bearing recesses is restricted by individual laminar flow orifices so that the recesses function as conventional bearings to radially support the mass within the bore. The arrangement is such that only the housing bore and the diameter of the cylindrical mass require close tolerance control. Axial support of the mass is achieved by supplying pressurized fluid through laminar flow orifices at opposite ends of the housing.

One object of this invention is to provide hydrostatic means for supporting a cylindrical mass within a housing while eliminating contact between the mass and housing.

Another object of this invention is to provide hydrostatic supporting means as described wherein dimensional tolerances may be relaxed to practical values.

Another object of this invention is to provide an arrangement as described wherein only the bore of the housing and the diameter of the mass require close tolerance control.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
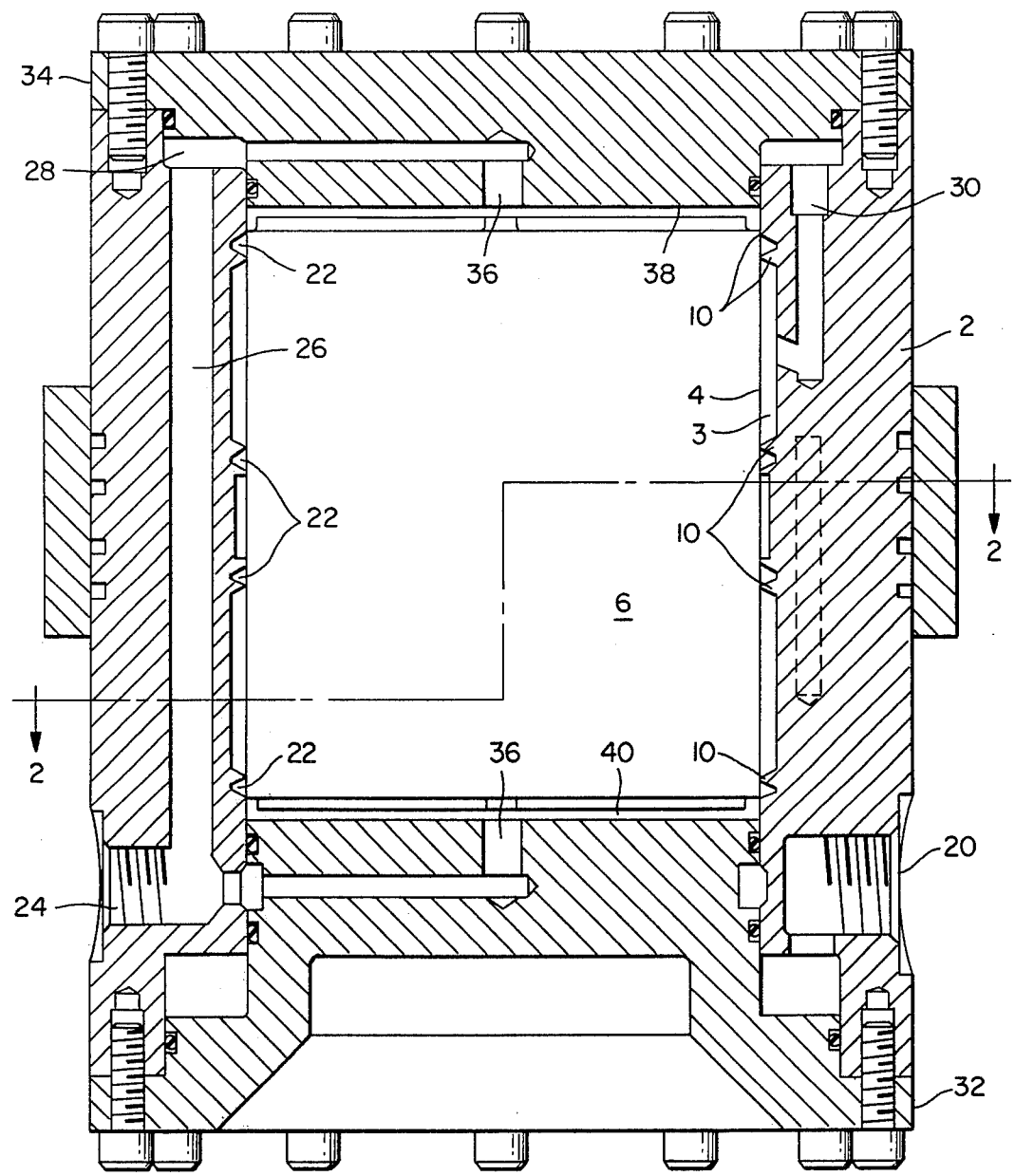
FIG. 1 is a sectioned front view of the invention taken along the line 1—1 in FIG. 2.
Figure 2:
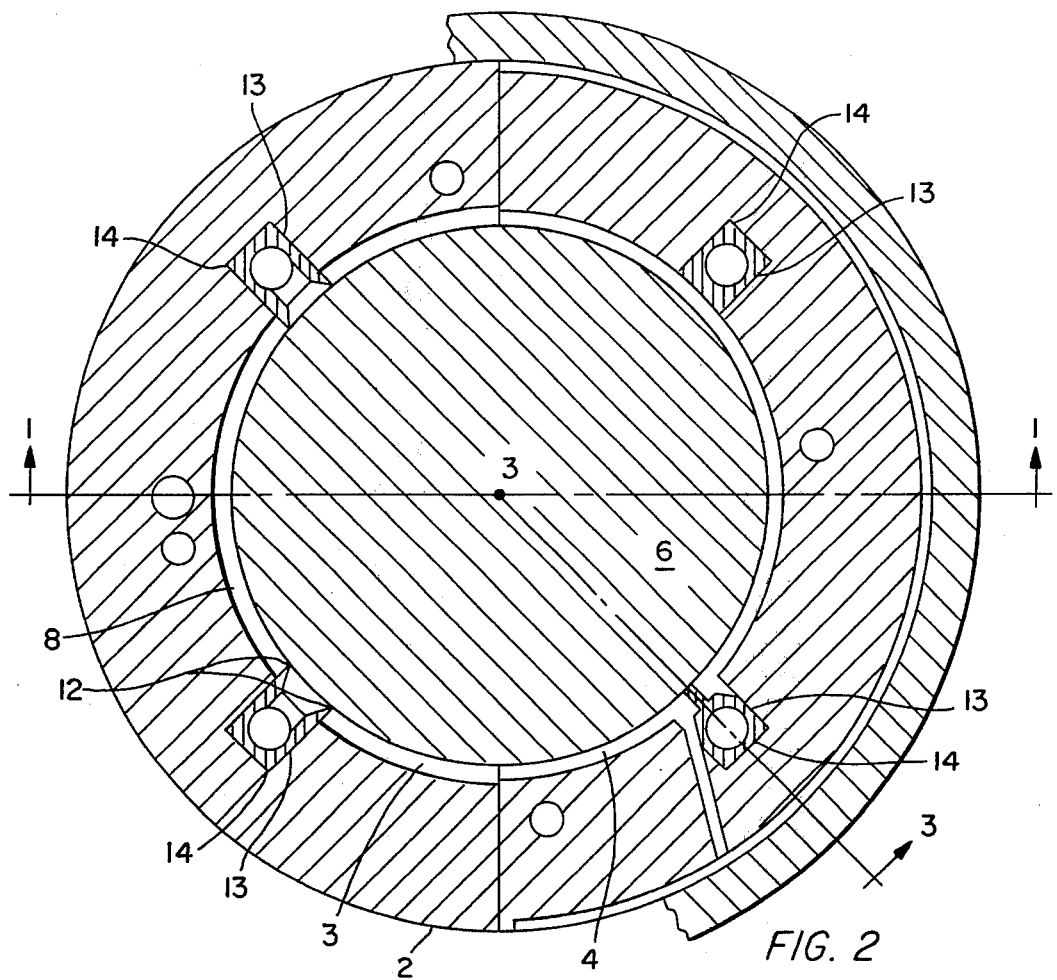
FIG. 2 is a sectioned top view of the invention taken along the line 2—2 in FIG. 1.

With reference to the figures, a housing designated by the numeral 2 has an inside diameter or bore 3 slightly larger than the outside diameter 4 of a cylindrical mass 6 as best shown in FIG. 1. Bore 3 contains a plurality of longitudinally disposed recesses 8 best shown in FIG. 2. Recesses 8 are bounded by arcuate lands 10 shown in FIG. 1 and by straight lands 12 shown in FIG. 2 to provide hydrostatic bearing recesses. Lands 10 are machined or otherwise provided integral with bore 3, while lands 12 are machined or otherwise provided in inserts 13 which are brazed or otherwise suitably secured in slots 14 provided in bore 3. In FIG. 2, four such inserts 13 are shown equidistantly disposed around the circumference of bore 3 of housing 2.

Figure 3:
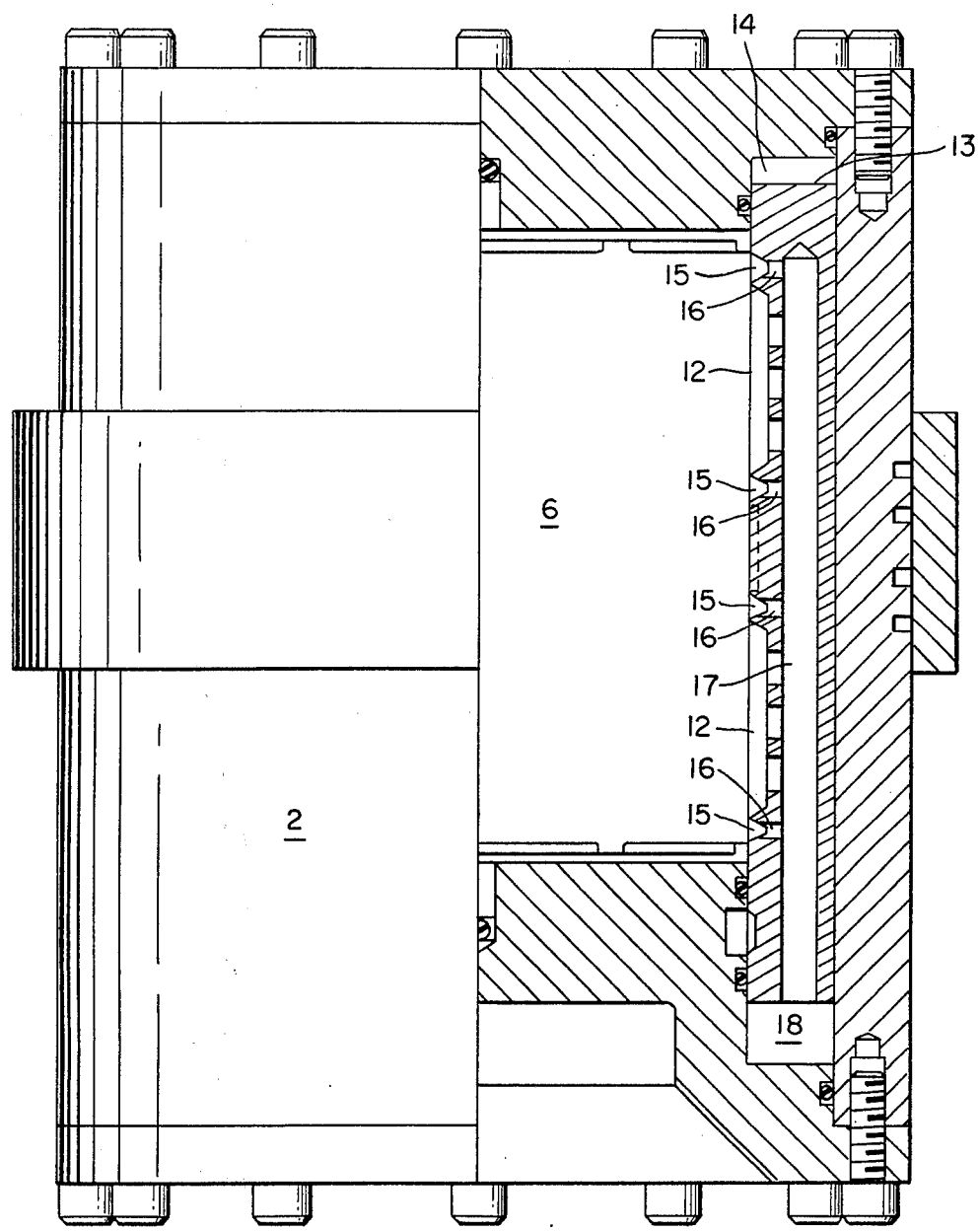
FIG. 3 is a partially sectioned front view of the invention taken along the line 3—3 in FIG. 2.

With reference to FIG. 3, each of the inserts has two lands 12 and a plurality of annular grooves 15 communicating through ports 16 and a longitudinally extending passage 17 with an annular manifold 18 leading to a drain connection 20 best shown in FIG. 1.

Bore 3 of housing 2 contains a plurality of annular grooves 22 (FIG. 1) which also drain through ports 16 to manifold 18. The bearing recesses so provided are supplied with a pressurized viscous fluid through an inlet port 24 via a longitudinally extending hole 26 to a manifold chamber 28 as best shown in FIG. 1. Fluid flow to individual recess is restricted by individual laminar flow orifices 30, and which recesses function as bearings in a conventional manner to radially support bore 3. End caps 32 and 34 secured at opposite ends of the housing complete the mass and housing assembly.

Figure 4:
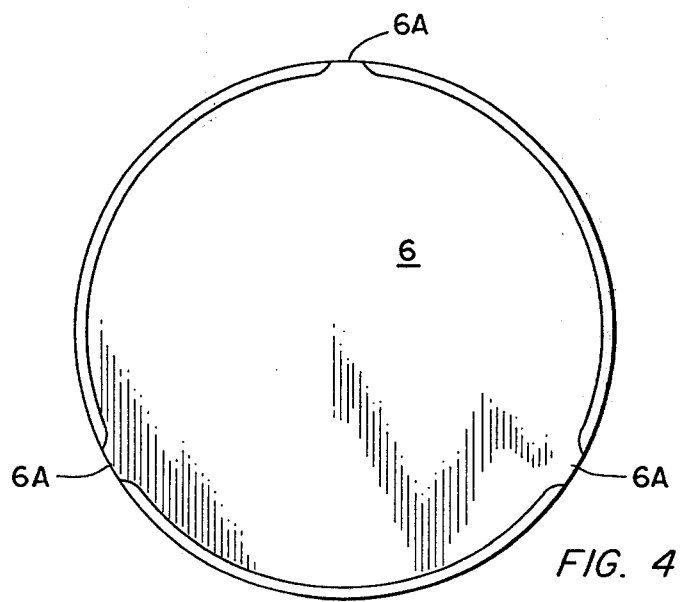
FIG. 4 is an end view of the hydrostatically supported mass.

Axial support of the mass for a device such as an integrating angular accelerometer described in the aforenoted U.S. application Ser. No. 555,924 is relatively unimportant and is achieved by supplying pressurized fluid through laminar flow orifices 36 at opposite ends of housing 2 to chambers 38 and 40 as best shown in FIG. 1. Controlled leakage occurs over the ends of mass 6 to drain. The ends of mass 6 carry protrusions 6A as shown in FIG. 4 to eliminate the possibility of the sharp edges of the mass "hanging up" on the lands in housing 2. The axial length between the outer lands in the housing is slightly less than the corresponding effective length of the rotor.

In operation, it will be assumed that mass 6 is displaced axially downward. Leakage occurs over the ends of the rotor as heretofore noted, thereby lowering the pressure in chamber 38 whereby the pressure in chamber 40 approaches a maximum as the leakage is restricted. The pressure differential urges mass 6 upward until an equilibrium condition is achieved. If the mass is initially displaced upward, the pressure in chamber 38 will approach a maximum as leakage from chamber 40 is restricted to provide the aforenoted equilibrium condition.

From the aforegoing description of the invention it will be see that while longitudinal dimensions must be controlled, the tolerances of these dimensions can be relaxed to practical values. Actually, only bore 3 of housing 2 and outside diameter 4 of rotor 6 require close tolerance control. Thus, a hydrostatic suspension system has been provided whereby close radial tolerances, dimensions and concentricities need not be controlled within extraordinary limits to provide the required bearing action.

While the invention has been described for use with an integrating angular accelerometer, any other device or instrument including a mass which must be hydrostatically suspended in a housing may utilize the invention as well.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A hydrostatic system for supporting a cylindrical mass within a bore of a housing, the diameter of the bore being slightly larger than the diameter of the cylindrical mass, comprising:
   a plurality of recesses disposed longitudinally along the bore and bounded by straight and arcuate lands in cooperative relation therewith for providing hydrostatic bearing recesses;
   means for supplying the hydrostatic bearing recesses with a flow of a pressurized viscous fluid including;
   an inlet port for receiving the fluid, an annular manifold chamber, a longitudinally extending passage communicating with the inlet port and the manifold chamber, and the pressurized fluid flowing through the inlet port and through the longitudinally extending passage, and flowing therefrom to the bearing recesses; and
   means for restricting the fluid flow to the bearing recesses for radially supporting the mass within the bore.

2. A system as described by claim 1, wherein:
the arcuate lands are integral with the bore.

3. A system as described by claim 1, including:
a plurality of slots disposed circumferentially around the bore;
a corresponding plurality of inserts, and each of the slots supporting an insert; and
the straight lands being carried by the inserts.

4. A system as described by claim 1, including:
the arcuate lands being integral with the bore;
a plurality of slots disposed circumferentially around the bore;
a corresponding plurality of inserts, and each of the slots supporting an insert; and
the straight lands being carried by the inserts.

5. A system as described by claim 1, including:
laminar flow orifices associated with the bearing recesses and restricting the fluid flow thereto.

6. A system as described by claim 3, wherein:
each of the inserts includes a plurality of ports in communication with the bearing recesses;
an annular manifold chamber;
a drain port in communication with the annular manifold chamber;
a longitudinally extending passage communicating with the plurality of ports and the manifold chamber; and
the fluid from the bearing recesses draining through the ports and the longitudinally extending passage to the manifold chamber, and therefrom through the drain port.

7. A system as described by claim 1, including:
a chamber at each end of the housing;
the longitudinally extending passage communicating with the chamber; and
the pressurized fluid flowing through the longitudinally extending hole to the chambers for axially supporting the mass.

8. A system as described by claim 7, including:
laminar flow orifices intermediate the longitudinally extending hole and the housing chambers for restricting fluid flow to the chambers.

9. A system as described by claim 7, including:
a drain port;
the fluid axially supporting the mass leaking over the ends of the mass to the drain port whereupon the mass is displaced toward one of the housing ends, and the pressure in the chamber in the one housing end is increased while the pressure in chamber in the opposite housing end is decreased for creating a pressure differential; and
the pressure differential displacing the mass toward the opposite housing end for supporting the mass in an equilibrium condition.

* * * * *